Dec. 19, 1967    J. H. PARK    3,359,488
CURRENT COMPARING APPARATUS AND SHUNT IMPEDANCE ELEMENTS
Filed June 8, 1964

INVENTOR.
JOHN H. PARK
BY
Reynolds & Christensen
ATTORNEYS

United States Patent Office 3,359,488
Patented Dec. 19, 1967

3,359,488
CURRENT COMPARING APPARATUS AND SHUNT IMPEDANCE ELEMENTS
John H. Park, Seattle, Wash., assignor to The Boeing Company, Seattle, Wash., a corporation of Delaware
Filed June 8, 1964, Ser. No. 373,405
9 Claims. (Cl. 324—55)

ABSTRACT OF THE DISCLOSURE

A current comparing apparatus is described which can be advantageously used in the calibration of current transformers. Improved shunt impedance elements and circuit arrangements for connecting the same in a balanced bridge circuit are disclosed and illustrated as being used in the current comparing apparatus. In one embodiment a ribbon resistance element having a closed loop conductor connected across the midpoint thereof provides two arms in a current comparing system. In another embodiment cylindrical resistance elements are nested in concentric relationship to provide an improved shunt impedance. An inductive voltage divider is disclosed in combination with a null detector circuit for determining the existence of balance in the bridge circuit with suitable reactance being included for determining the phase angle between the primary and secondary currents in a transformer.

---

Figure 1:
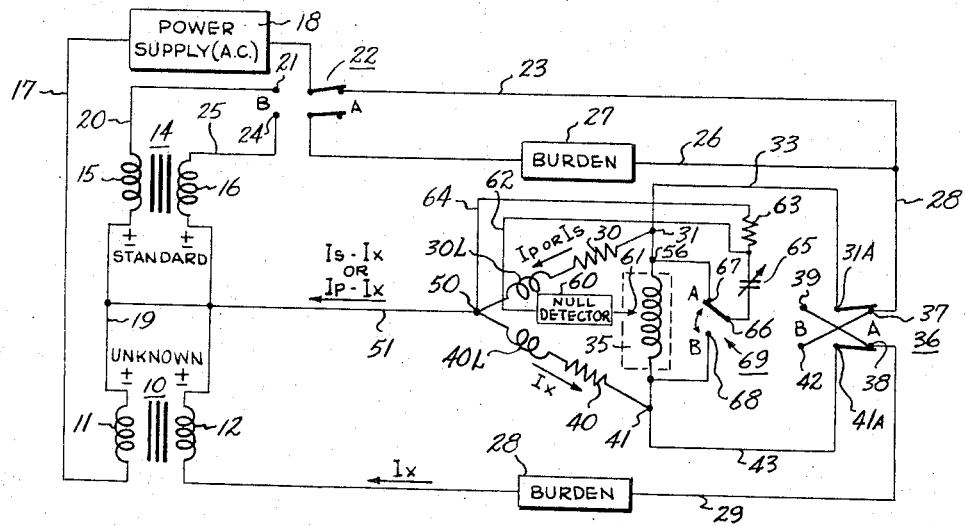

For measuring current, power or energy at high levels instrument transformers are commonly used in order to avoid the problems inherent in working directly with high voltage lines. For accurate measurements it is necessary that the ratio and phase characteristics of the transformer be known. In view of the possibility of damage to such transformers which might be caused by current surges of other distrubances it is the usual practice to make periodic tests of the instrument transformer characteristics. Thus it is advantageous to have available equipment for checking the transformers which is not only accurate but which is easily used for various types of transformers. The recent use of a large number of power supplies at various frequencies in air and space vehicles has further made the calibration of current transformers at audio frequencies of increasing importance.

In general the testing of current transformers to ascertain their ratio correction factor and phase angle has been accomplished by direct measurements on a single transformer or by comparing the characteristics of a known transformer with those of the unknown transformer. In the direct method the current ratio as well as the phase angle between the primary and secondary current are directly measured, whereas in the relative method the secondary current of the transformer being tested is compared with that of a standard transformer. One difficulty which has been encountered in the past is that if the two currents being compared are not approxiamately equal unpredictable errors are encountered. Part of this problem is believed to have been caused by the construction of the shunt elements used in the systems.

It is therefore an object of the present invention to provide an improved current comparator.

It is another object of the present invention to provide an improved current comparator adapted to provide an accurate measurement of the ratio and phase angle between the current in the primary and secondary windings of a transformer.

A further object of the present invention is to provide an improved current comparator which can be used for comparing the characteristics of an unknown transformer with those of a known transformer and wherein the nominal ratios of the two transformers need not be the same.

Another object of the present invention is to provide an improved current comparator which includes shunt means so constructed that the magnitude of the two currents being compared need not be the same and yet accurate results are achieved.

An additional object of the present invention is to provide an improved current comparator so constructed that the errors normally caused by stray signal pickup and lead interconnections within the system are reduced.

Another object of the present invention is to provide an improved shunt adapted for use in current comparator systems.

In accordance with the teachings of the present invention a pair of shunt impedance elements in the form of a standard and unknown transformer or the primary and secondary currents, respectively of an unknown transformer applied thereto in a manner such that the difference between the two currents is provided in a lead appropriately connected to a point which is common to the two resistors. The two resistors may advantageously be made from a single strip of resistive material, such as a ribbon of manganin wire, with the difference current lead being connected to a point intermediate the two ends of the single strip of resistance material. An adjustable inductive voltage divider is connected to the ends of the shunts with a null signal detector being connected to the voltage divider and through an impedance element to the junction of the two shunts. The inductive voltage divider can then be adjusted to bring the detector to a zero reading. Then by using the readings on the inductive voltage divider at the null condition in the equations set forth hereinafter the ratio correction factor for the transformer under test is readily ascertained. A variable capacitance selectively connected in circuit with the null detector provides readings which when used in other equations makes possible an accurate determination of the phase angle of the transformer under test.

In accordance with one embodiment of the invention the junction point of the two shunt resistance elements is preferably made through the use of a loop of low impedance material such as a copper wire soldered across the center of a length of resistance material such as a ribbon of manganin which serves as the two shunt impedance elements. The potential lead going to the null detector is then connected to the center of the portion of the copper wire which is in contact with the manganin ribbon. Thus a completely symmetrical electrical connection is made and the current flow to and from the shunts from and to the copper conductor is accurately monitored by the detector and also spurious magnetic fields are avoided. The two sections of the ribbon forming the two shunts are advantageously placed next to each other to maintain the temperature of the two uniform. In another embodiment of the invention two tubular resistance elements are respectively disposed about and inside of a tubular conductor which carries the different current. With this arrangement a uniform junction between the shunts and the difference current lead is readily achieved. The previously mentioned potential lead is then easily attached to the uniform junction, as for example by means of a cap secured to the end of the tubular conductor. Additional potential leads for the null detector and/or inductive divider are positioned inside of the tubular arrangement so that the effect of stray magnetic fields is reduced.

Figures 2, 3:
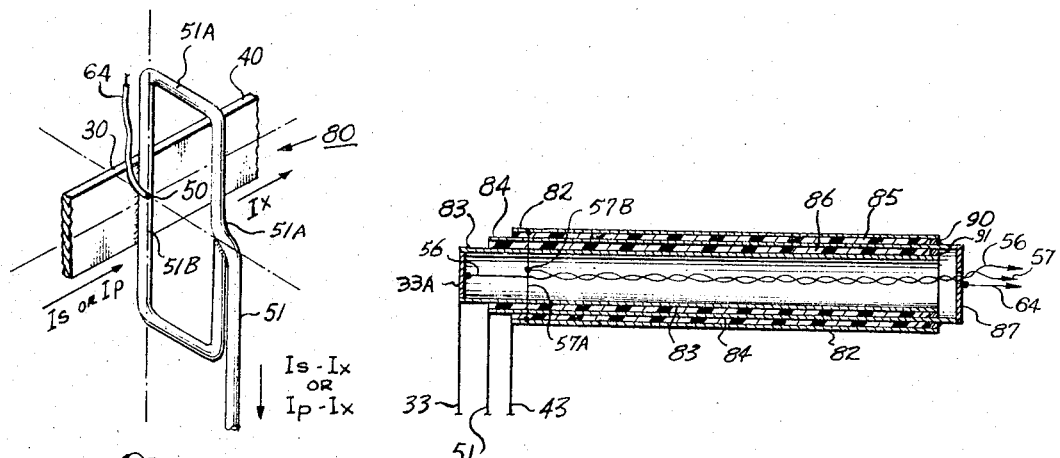
Figure 2A:
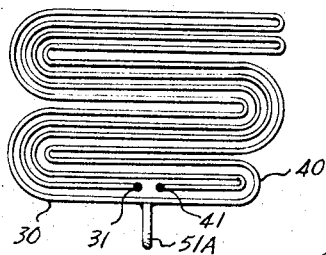

The above and additional advantages and objects of the present invention will be more clearly understood from the following description when read with reference to the accompanying drawings wherein, FIGURE 1 is a schematic circuit diagram of a preferred current comparing system, FIGURE 2 is an enlarged isometric view of the shunt resistance elements of the schematic circuit diagram of FIGURE 1 showing in detail the construction and manner of attaching the various conductors to the shunt impedance elements, FIGURE 2A is a plan view illustrating the manner in which the ribbon of impedance material of FIGURE 2 is arranged to enhance system accuracy, and FIGURE 3 is a cross section of a further embodiment of the shunt arrangement of the present invention illustrating the use of tubular elements.

Referring now to the drawings and in particular to FIGURE 1 there is shown for purpose of illustration a current transformer 10 having a primary winding 11 and a secondary winding 12 which will be referred to as the unknown transformer whose characteristics are to be ascertained. A second transformer 14 having a primary winding 15 and a secondary winding 16 will be referred to as a standard transformer having known characteristics and adapted for use in the comparison technique described hereinafter for providing information concerning the characteristics of the unknown transformer as compared to the known characteristics of the standard transformer. It will be seen that a first conductor 17 from a power supply 18 is connected to the primary winding 11 which is in turn connected directly by the line 19 to the primary winding 15 of the standard transformer. The primary winding 15 will also be seen to be connected by lead 20 to the switch terminal 21 of the switch 22 which is adapted to selectively connect the terminal 21 to the other side of the power supply 18. For purpose of illustration the switch 22 is shown as having an A position and a B position. The arrangement is such that when the switch is in its B position the primary windings 15 and 11 will be directly connected in series circuit arrangement with the power supply for simultaneous energization thereby. When the switch 22 is in its A position it will be seen that the primary winding 15 of the standard transformer is disconnected and also that the secondary winding 16 of the standard transformer which is connected to the terminal 24 by the lead 25 is disconnected from the circuit. The arrangement is such that when the switch 22 is in its A position the system is adapted for direct computation of the characteristics of an unknown transformer while positioning of the switch 22 in its B position renders the system operable for ascertaining the characteristics of the unknown transformer by the comparison technique.

The current comparator will be seen to include a pair of shunt impedance elements 30 and 40 connected at a common junction point 50. As described hereinafter, in practice the shunt elements 30 and 40 are preferably made from a single strip of resistance material such as manganin ribbon with the junction 50 between the two being at the center point of the total length of ribbon. While the shunt elements 30 and 40 are constructed to have a minimum inductance, there nevertheless normally is a certain inductance associated with each. Therefore in FIGURE 1 the inductances 30L and 40L which represent the natural inductances of the shunts are shown as being respectively connected in series circuit with the elements 30 and 40. A low resistance conductor 51 will be seen to extend from the junction or terminal 50 to each of the four transformer windings.

An inductive voltage divider 35 commonly referred to as a ratio transformer will be seen to be connected to the ends 31 and 41 of the shunt elements 30 and 40. The ends of the shunt impedance elements will also be seen to be respectively connected by leads 33 and 43 to the input terminals 31a and 41a associated with a second switch 36 which is of the double pole, double throw type and is adapted to selectively connect either of the shunt impedance elements to either of the two secondary windings 12 or 16. To this end it will be seen that the secondary winding 16 of the standard transformer is connected through a first burden 27 and via the leads 26 and 28 to the terminal 37 of the switch 36. In a similar manner the secondary winding 12 is connected through the burden 28 via the lead 29 to the terminal 38 of the switch 36. By means of the usual cross connectors it will be seen that with switch 22 in its A position and switch 36 in its A position, as indicated in FIGURE 1, the secondary winding 12 will be connected in series circuit with the shunt 40 and the secondary winding 16 will be connected in series circuit with the shunt 30. When the switch 36 is changed to its B position, the secondary winding 12 will be connected in series circuit with the shunt 30 and the secondary winding 16 will be connected in series circuit with the shunt 40. The advantage of this arrangement is that if the resistances of shunts 30 and 40 are not exactly the same, any effect caused by this inequality will be canceled by taking two readings with the currents flowing in the shunt elements interchanged.

A null detector 60 will be seen to be connected by means of the tap 61 to a variable point on the inductive voltage divider 35 and also by means of a lead 62 to a resistance element 63 and thence by lead 64 to the common junction 50 between the two shunt impedance elements. The null detector 60 can be any of a number known in the art as, for example, an AC galvanometer. Suitable capacitance in the form of a variable capacitor 65 will be seen to be connected to the lead 62 between the null detector 60 and the resistance 63 and also the central terminal 66 of a third switch 69 having contacts 67 and 68 with which the central terminal 66 is selectively engaged. When switch 69 is in its A position it will be seen that the capacitor 65 will be connected to the end 31 of the shunt 30. When switch 69 is in its B position the capacitor 65 will be connected to the end 41 of the shunt 40.

As previously stated, the system is not only adapted for use with a standard transformer, but also is adapted for direct determination of the characteristics of a single transformer. When the switch 22 is in its A position one side of the power supply 18 is connected by leads 23 and 28 to the switch 36 and hence to one or the other of the shunt impedance elements, depending on the position of switch 36.

The operation of the arrangement illustrated in FIGURE 1 will be first given with the switch 22 in its A position for determining directly the ratio correction factor and phase characteristics of the unknown transformer 10. It will be seen that with the switch 22 in its A position the standard transformer 14 is completely removed from the circuit and has no effect thereon. With the switch 36 in its A position current from the supply 18 goes through the leads 23 and 28 through the switch 36 to the shunt impedance element 30. This current then passes through the leads 51 and 19 to the primary winding 11 and to the other side of the power supply 18. The transformer 10 is wound in the manner indicated with the polarity of the voltage induced in the secondary winding 12 such that when current is flowing in the above indicated direction from the supply 18, secondary current will be provided from the secondary winding 12 through the shunt impedance element 40 as indicated in FIGURE 1 by the arrow labeled $I_X$. The lead 51 therefore has the difference between the primary and secondary currents flowing therein and thus is labeled as having the current $I_P-I_X$ flowing therein. Since the system is adapted for use in the audio frequency range, it will of course be obvious that the current flows indicated in FIGURE 1 are for purpose of illustration only and that in practice the flow of current would be reversing at the frequency of the power supply. However, the relative directions of current flow at each instant would remain the same, namely in opposite directions through the shunts. It should also be noted that if the switch 36 is moved to its B position the same relative directions of current flow will take place but the primary current $I_p$ will flow through the shunt 40 and the secondary current will flow through the shunt 30.

In determining the characteristics of the transformer 10 by the direct method the setting of the inductive voltage divider 35 is adjusted until a null indicaion is provided by the detector 60. In practice the indicative voltage divider 35 can be any one of a number readily available on the market, as for example the seven dial divider manufactured by Electro Scientific Instruments. The divider serves as a convenient means for indicating the relative magnitude of the voltages between tap 61 and the shunt terminals 31 and 41. By having the total voltage across the divider equal to unity a direct reading system is provided which makes for simplified operation. As set forth hereinafter the readings of the divider are used in simplified equations for ascertaining the transformer characteristics. With the switch 36 in its A position the switch 66 is placed in either its A or its B position as required for obtaining a null indication on the detector 60. When the switch 36 is reversed to its B position the shunt resistances 30 and 40 are interchanged in the primary and secondary current paths. A second null reading is then obtained with the switch 66 being either in its A or its B position for obtaining the null condition. With the two readings thus obtained from the inductive voltage divider and the two readings from capacitor 65 it will be shown hereinafter that the ratio correction factor and phase angle of the unknown transformer 10 are readily obtained.

When the system of FIGURE 1 is to be used with a standard transformer for ascertaining the characteristics of the unknown transformer 10, the switch 22 is placed in its B position so that power from the supply 18 is applied through conductors 20 and 17 to the primary windings 15 and 11 which will be seen to be in a series circuit arrangement. It will also be seen that with switch 22 in its B position the conductor 23 is removed from the circuit and the secondary winding 16 is connected through the standard burden 27 and lead 26 to the switch 36. As a result thereof the current provided through the switch 36 to either the shunt 30 or the shunt 40 (depending upon the position of switch 36) will be provided by the secondary windings 16 and 12. In a manner similar to that above, two sets of readings are taken from the inductive voltage divider and from the capacitor 65 for the null conditions of the detector. The readings thus obtained are used with the following equations for ascertaining the phase angle and ratio correction factor for the unknown transformer:

When the phase angle of the standard transformer is greater than the phase angle of the unknown transformer the following equations are used with the readings obtained:

$$rf_x = rf_s \left[ 1 + \tfrac{1}{2} \left( A_1 - B_1 + \frac{N_s - N_x}{N_x + N_s} \right) \left( \frac{N_x + N_s}{N_x} + \frac{N_x + N_s}{N_s} \right) \right] \quad (1)$$

$$B_x = B_s - \tfrac{1}{2} \left[ \frac{a_1}{1 - A_1} + \frac{b_1}{B_1} \right] \quad (2)$$

When the phase angle of the unknown transformer is less than the phase angle of the standard transformer the following equations are used:

$$rf_x = rf_s \left[ 1 + \tfrac{1}{2} \left( A_2 - B_2 + \frac{N_s - N_x}{N_x + N_s} \right) \left( \frac{N_x + N_s}{N_x} + \frac{N_x + N_s}{N_s} \right) \right] \quad (3)$$

$$B_x = B_s + \tfrac{1}{2} \left( \frac{b_1}{A_2} + \frac{a_1}{1 - B_2} \right) \quad (4)$$

Where:
$rf_x$ = ratio correction factor for the unknown transformer
$rf_s$ = ratio correction factor for the standard transformer
$N_x$ = nominal turns ratio at the unknown transformer
$N_s$ = nominal turns ratio at the standard transformer
$A_1$ = reading of divider 35 at null condition with switches 36 and 66 in A positions, which equals the ratio of voltage between tap 61 and point 31 to the total voltage between points 31 and 41
$B_1$ = reading of divider 35 at null condition with switches 36 and 66 in B position
$A_2$ = reading of divider 35 at null condition with switch 36 in A and 66 in B positions
$B_2$ = reading of divider 35 at null condition with switch 36 in B and 66 in A positions
$a_1 = WCR$ with the switch 66 in A position
$b_1 = WCR$ with switch 66 in B position
$W = 2\pi f$
$C$ = capacitance of capacitor 65 in farads
$R$ = resistance of resistor 63 in ohms In the above generalized equations the factors $N_s$, $B_s$, and $rf_s$ are set equal to one when the system is used with switch 22 in its A position for direct determination of the characteristics of transformer 10. It should be noted that the actual values of the resistance of the shunt elements is not needed so long as their ratio remains constant for the readings.

When using the system of FIGURE 1 it is found that if the current through the two shunts 30 and 40 is very nearly equal then the junction 50 can be treated as two current leads and one potential lead. As long as the currents do remain substantially equal, as is the case when the two transformers have the same ratios, separate shunts 30 and 40 can be connected by normal techniques at point 50 with the potential lead 64 then being connected thereto. However such an arrangement would be primarily restricted to measurements of currents having a one-to-one ratio. When the current flow through the two shunts is not substantially equal, the junction 50 must be considered as three current leads and one potential lead. The specific manner of construction of the junction 50 then becomes of greater importance. It is found that it is then necessary for the potential lead 64 to be connected to the exact center of the Y which ties the current leads together. It is found in practice that a very small difference in the positioning of the potential lead 64 from the center of the Y leads to substantial errors. In addition, it is advantageous to provide the connection of the lead 51 to the junction point 50 in a particular manner so that the current flowing to or from the junction 50 from or to the lead 51 is symmetrical. A preferred manner of constructing the junction 50 and the associated leads 64 and 51 is illustrated in FIGURE 2.

Referring now to FIGURE 2 there is shown for purpose of illustration a single ribbon of resistance material (10 mils thick, 1 inch wide, 10 feet long) 80 which serves as the two shunt elements 30 and 40 of FIGURES 1 and 2. In one such shunt the ribbon 80 was a 10 mil by 1 inch by 10 feet ribbon of manganin. The lead 51 is secured to the center of the length of ribbon 80 by means of the loop of copper wire 51A having a straight section 51B which is disposed transverse to the longitudinal axis of the ribbon. The plane of the loop 51A is also preferably but not necessarily perpendicular to the longitudinal axis of the straight section of ribbon 80 at the point of connection of the loop thereto. The straight section 51B is soldered by means of silver soldering or brazing techniques to the ribbon 80 across the entire width of the ribbon so that the straight section 51B of the loop is in good electrical engagement with the ribbon. The arrangement is preferably as indicated and is such that the loop 51A is not only perpendicular to but is also symmetrical with respect to the longitudinal axis of the ribbon 80. Thus it will be seen in FIGURE 2 that the loop 51A extends above and below the ribbon 80 by equal amounts. As a result of this manner of attaching the lead 51 to the shunt impedance elements the current flowing up and out of the ribbon through the upper half of the loop 51A will be equal to that flowing down and out of the ribbon through the lower half of the loop 51A. Thus the current flow lines in the ribbon are symmetrical with respect to its central axis for any ratio of the two currents flowing through the two halves of the ribbon which serves as the shunt impedance elements 30 and 40.

After the loop 51A has been attached to the ribbon 80, the exact center of the straight section 51B of the loop 51A is located by direct measurement techniques. Then at this point on the section 51B the potential lead 64 is attached. Simultaneous welding, brazing, or soldering of the loop 51A to the ribbon 80 and of the lead 64 to the loop 51A can be readily achieved or, in the alternative, the loop 51A can be attached to the ribbon 80 by means of a uniform silver solder joint and then the potential lead 64 attached to the loop 51A by means of conventional soft solder. By constructing the junction 50 in the manner indicated in FIGURE 2, the potential lead is attached to the exact center of the Y of FIGURE 1. Experimental results obtained by using the manner of construction illustrated in FIGURE 2 verify the desirability of such a manner of construction.

To further improve the accuracy of the system and reduce the effect of heat generated by current in the shunts the ribbon 80 is preferably arranged in the manner indicated in FIGURE 2A. The shunt sections 30 and 40 will be seen to be interlaced so that the temperature of the two sections remains substantially equal even though different magnitudes of current flow therethrough. With this arrangement a six terminal shunt is provided—three current terminals corresponding to terminals 31, 41 and 50 of FIGURE 1 and three potential terminals for leads 64, 56, and 57. As seen in FIGURE 2 lead 64 is connected to the center of loop section 51B with leads 56 and 57 being attached to the ends of ribbon 80 in a manner conventional in the art.

In the embodiment of the shunt arrangement shown in FIGURE 3 it will be seen that the shunt impedance elements 30 and 40 of FIGURE 1 are in the form of the resistance tubes 82 and 83 which are respectively disposed about and within a copper tube 84 which corresponds to part of the lead 51 in the system of FIGURE 1. Suitable insulating material is provided in the spaces 85 and 86 between the resistance tubes and the copper conducting tube 84. The right ends of the resistance tubes 82 and 83 are electrically connected to the copper tube 84 by means of the copper rings 90 and 91 to which the three tubes are soldered. The junction of the resistance tubes and the copper tube is made continuous and uniform around the circumference. A low resistance metallic cap such as, for example, made of copper and indicated at 87 is then soldered to the end of the copper tube 84 to facilitate attachment of lead 64. The potential lead 64 is then soldered to the cap 87, preferably near the center thereof. The leads 33 and 43 which are shown in FIGURE 1 as extending from the switch 36 to the ends 31 and 41 of the shunt impedance elements 30 and 40 are shown in FIGURE 3 as copper straps connected to the left ends of the resistance tubes 82 and 83. The leads 56 and 57 extending from the terminals 31 and 41 in FIGURE 1 will be seen to be in the form of a twisted pair extending up through the center of the arrangement in FIGURE 3 and passing through a suitable hole in the cap 87 for connection to the inductive divider in the manner indicated in FIGURE 1. By this arrangement of the leads inside the tubes the chance of stray magnetic fields affecting the system is materially reduced.

Since in the arrangement of FIGURE 3 the outer tube of resistance material 82 is of larger diameter than is the tube 83, it will be seen that the outer tube can be slightly shorter than the inner tube and yet provide the same resistance when the two are made from the same gauge material. This facilitates construction since the copper strap forming lead 33 can then be in the form of a cap 33A at the end of resistance tube 83 and sufficient space remains for the soldering of leads 51 and 41 around the tubes 82 and 84. Suitable holes are provided through tubes 83 and 84 to permit the potential leads 57A to pass therethrough from their points of connection to the interior of tube 82. Four such leads 57A are preferably used for symmetry of current flow and are joined at point 57B for connection of the lead 57 seen in FIGURES 3 and 1.

There has been described an improved current comparator system and including in particular improved shunts for use in such systems. By using the teachings of the present invention accurate calibration of a current transformer is obtained by direct measurements or by comparison to a standard transformer which need not be of the same nominal ratio as the transformer being tested. While the invention has been disclosed by reference to the details shown in the accompanying drawings it is intended that those modifications which are obvious to a person skilled in the art from the teaching hereof will be encompassed by the following claims.

What is claimed is:

1. A current comparator comprising in combination: a first shunt impedance element having first and second sections; a second shunt impedance element having first and second sections; a first conductor connected in common to each of said first sections; an inductive voltage divider connected between said second sections; a null voltage detector and a resistor connected in series circuit between said first conductor and to an intermediate point of said inductive voltage divider; a capacitor connected to said resistor; and switch means connected to said capacitor and adapted to selectively connect to either of said second sections.

2. A current comparator in accordance with claim 1 wherein said shunt impedance elements are a single piece of resistance material with said first sections being the center of said piece of material and wherein said first conductor comprises a loop of conductive material having a portion thereof electrically connected across the width of said piece of resistance material perpendicular to the longitudinal axis thereof.

3. A current comparator in accordance with claim 2 wherein the series circuit provided by said resistor and said detector is electrically connected to the center point of the junction of said loop of conductive material with said piece of resistance material.

4. A current comparator in accordance with claim 2 wherein the plane of said loop is perpendicular to the longitudinal axis of said resistance material.

5. A current comparator in accordance with claim 1 wherein said shunt impedance elements are first and second concentric cylinders of resistance material, wherein said conductor is a third cylinder of conductive material disposed about said first cylinder and inside of said second cylinder, and wherein adjacent ends of said first and second cylinders are uniformly electrically connected to said third cylinder of conductive material.

6. A shunt impedance element comprising in combination: a strip of resistance material; a closed loop of conductive material having a straight section connected across the entire width of said strip at the center thereof to provide a uniform electrical joint across said width between the conductive material and the resistance material; a potential lead connected to the center point of the junction of said loop with said strip; and a current lead connected to said loop at a point remote from said straight section opposite said potential lead.

7. A shunt impedance element in accordance with claim 6 wherein the plane of said loop is perpendicular to the longitudinal axis of said strip of material.

8. A shunt impedance element comprising in combination: first and second concentric cylinders of resistance material; a third cylinder of conductive material disposed about said first cylinder and inside of said second cylinder; means electrically connecting adjacent ends of said first and second cylinders to said third cylinder; a conductive cap connected across the end of said third cylinder adjacent said connection of said first and second cylinders thereto, and a potential lead connected to said cap.

9. A shunt impedance element in accordance with claim 8 and including second and third potential leads twisted together inside said first cylinder and respectively connected to the interior of said first and second cylinders.

References Cited

UNITED STATES PATENTS

| | | | |
|---|---|---|---|
| 2,137,787 | 11/1938 | Snow | 338—61 X |
| 2,566,140 | 8/1951 | Petch | 324—55 |
| 2,568,600 | 9/1951 | Wirk | 338—61 |
| 2,911,591 | 11/1959 | Pritchett | 324—55 |
| 2,945,993 | 7/1960 | Kuhrt | 324—45 X |
| 3,188,562 | 6/1965 | Kusters et al. | 324—55 |

RUDOLPH V. ROLINEC, *Primary Examiner.*

WALTER L. CARLSON, *Examiner.*

G. STRECKER, *Assistant Examiner.*

Disclaimer and Dedication

3,359,488.—*John H. Park*, Seattle, Wash. CURRENT COMPARING APPARATUS AND SHUNT IMPEDANCE ELEMENTS. Patent dated Dec. 19, 1967. Disclaimer and dedication filed Oct. 1, 1969, by the assignee, *Electro Scientific Industries, Inc.*

Hereby enters this disclaimer and dedication to the Public to all of the claims of said patent.

[*Official Gazette January 20, 1970.*]